(12) United States Patent
Howell et al.

(10) Patent No.: US 12,504,767 B2
(45) Date of Patent: Dec. 23, 2025

(54) HEADING CONTROL SYSTEM

(71) Applicant: AIRBUS OPERATIONS LIMITED, Bristol (GB)

(72) Inventors: George Howell, Bristol (GB); Andrew Hebborn, Bristol (GB); James Kirrane, Bristol (GB); Stephen Daniel Pollard, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 373 days.

(21) Appl. No.: 17/767,341

(22) PCT Filed: Oct. 5, 2020

(86) PCT No.: PCT/EP2020/077784
§ 371 (c)(1),
(2) Date: Apr. 7, 2022

(87) PCT Pub. No.: WO2021/069348
PCT Pub. Date: Apr. 15, 2021

(65) Prior Publication Data
US 2022/0365531 A1   Nov. 17, 2022

(30) Foreign Application Priority Data
Oct. 9, 2019  (GB) .................................. 1914616.6

(51) Int. Cl.
*G05D 1/00* (2024.01)
*B64C 25/50* (2006.01)
(Continued)

(52) U.S. Cl.
CPC ............. *G05D 1/437* (2024.01); *B64C 25/50* (2013.01); *G05D 1/495* (2024.01)

(58) Field of Classification Search
CPC ...... G05D 1/437; G05D 1/495; G05D 1/0083; G05D 1/0204
(Continued)

(56) References Cited

U.S. PATENT DOCUMENTS 3,346,965 A * 10/1967 Piper ...................... G01B 5/255
33/301
5,353,022 A * 10/1994 Middleton ............. G08G 5/025
701/15
(Continued)

FOREIGN PATENT DOCUMENTS

JP         61253263        11/1986
WO      2014/076486        5/2014

OTHER PUBLICATIONS

International Search Report and Written Opinion for PCT/EP2020/077784, mailed Jan. 27, 2021, 9 pages.

*Primary Examiner* — Helal A Algahaim
*Assistant Examiner* — Michael T Dowling
(74) *Attorney, Agent, or Firm* — Nixon & Vanderhye P.C.

(57) ABSTRACT

A heading control system for an aircraft arranged to maintain a heading of an aircraft by controlling a nose wheel angle of the aircraft. The heading control system includes an interface arranged to receive a bias signal indicating a bias towards the port or the starboard of the aircraft and one or more processors. The one or more processors are arranged to determine, based on the bias signal, an offset angle defining an offset from a longitudinal axis of the aircraft and to perform a control process to control the nose wheel angle within an angular range based on the offset angle.

18 Claims, 5 Drawing Sheets

(51) Int. Cl.
*G05D 1/437* (2024.01)
*G05D 1/495* (2024.01)

(58) Field of Classification Search
USPC .............................................................. 701/3
See application file for complete search history.

(56) References Cited

U.S. PATENT DOCUMENTS

| | | | |
|---|---|---|---|
| 6,722,610 B1* | 4/2004 | Rawdon | B64C 25/50 |
| | | | 244/103 W |
| 2007/0051547 A1* | 3/2007 | Fischer | B60K 31/0075 |
| | | | 180/204 |
| 2008/0188998 A1 | 8/2008 | Venios et al. | |
| 2008/0312792 A1* | 12/2008 | Dechamp | B60Q 1/48 |
| | | | 701/41 |
| 2011/0022251 A1* | 1/2011 | Puig | G05D 1/0083 |
| | | | 701/16 |
| 2017/0008619 A1 | 1/2017 | Romana et al. | |
| 2017/0158316 A1 | 6/2017 | Sharpe | |
| 2019/0118939 A1* | 4/2019 | Cantinaud | B64C 25/426 |
| 2019/0118940 A1 | 4/2019 | Dupre et al. | |

* cited by examiner

HEADING CONTROL SYSTEM

This application is the U.S. national phase of International Application PCT/EP2020/077784, filed Oct. 5, 2020 which designated the U.S. and claims priority to United Kingdom patent application GB 1914616.6, filed Oct. 9, 2019, the entire contents of each of which are hereby incorporated by reference.

TECHNICAL FIELD

The present invention relates to a heading control system for an aircraft and a method and computer program for operating the same.

BACKGROUND

Modern aircraft typically have landing gear comprising a plurality of undercarriages which support the aircraft when it is on the ground. Some of the undercarriages have braking wheels which are operable to provide a braking force to decelerate the aircraft when a braking torque is applied by a set of brakes. One or more of the undercarriages is steerable and may be rotated to steer the aircraft.

During some ground manoeuvres, the aircraft may experience unintended changes in heading, for example due to external factors such as cross-winds, gusts and variations in a runway surface, as well as aircraft factors such as uneven tyre pressure, asymmetric braking, asymmetric engine thrust or component failures. To compensate for these asymmetries, some aircraft include heading control systems which can control the nosewheel angle without input from the flight crew.

Aircraft with shorter wheelbases tend to be more sensitive to steering inputs and so the range of angles within which a heading control system can control the nose wheel without risk of severe lateral movement is reduced. Accordingly, the degree to which the heading control system is able to control the nosewheel angle during ground manoeuvres tends to be lower.

Furthermore, to reduce levels of noise and pollution at airports, and to reduce fuel consumption, it is common practice to perform certain ground manoeuvres, such as taxiing, with one or more engines not producing significant thrust. For example, in certain dual engine aircraft, it is common prior to take-off to taxi to the runway using only one engine, and/or to shut down one of the engines shortly after landing. This results in an asymmetry in the thrust to produce a yawing moment, which is exacerbated in shorter wheelbase aircraft, which commonly have only two engines: one engine mounted under each wing.

The present invention mitigates the above-mentioned problems and accordingly may provide an improved system and method for controlling the heading of an aircraft.

SUMMARY

A first aspect of the present invention provides a heading control system for an aircraft, the heading control system being arranged to maintain a heading of an aircraft by controlling a nose wheel angle of the aircraft, the heading control system comprising: an interface arranged to receive a bias signal indicating a bias towards the port or the starboard of the aircraft; and one or more processors arranged to: determine, based on the bias signal, an offset angle defining an offset from a longitudinal axis of the aircraft; and perform a control process to control the nose wheel angle within an angular range based on the offset angle.

Optionally, the angular range is centred on the offset angle.

Optionally, the heading control system comprises an automated steering system of the aircraft and the control process comprises constraining the heading control system to vary the nose wheel angle only within the angular range.

Optionally, the bias signal is received from one or more sensors of the aircraft.

Optionally, the bias signal indicates one or more readings from the one or more sensors.

Optionally, the one or more readings comprises a first reading relating to a starboard engine of the aircraft and a second reading relating to a port engine of the aircraft.

Optionally, the one or more processors is arranged to determine the offset angle based on a relationship between the first reading and the second reading.

Optionally, the bias signal is based on one or more of: throttle settings of the respective engines; temperature measurements from at least one portion of the respective engines; pressure measurements from at least one portion of the respective engines; a fan speed of the respective engines.

Optionally, the bias signal is based on a wind direction signal generated by a wind direction sensor arranged to determine a wind direction with respect to the longitudinal axis of the aircraft.

Optionally, the offset angle is determined based on data indicating a determined ground speed of the speed and/or data indicating a heading of the aircraft.

Optionally, the angular range is less than or equal to 12 degrees.

A second aspect of the present invention provides a method of operating a heading control system of an aircraft, the method comprising: receiving a bias signal indicating a bias towards the port or the starboard of the aircraft; generating, based on the bias signal, an offset angle defining an offset from a longitudinal axis of the aircraft; and controlling a nose wheel angle within an angular range based on the offset angle.

Optionally, the method comprises: determining, from at least the offset signal, whether the aircraft is configured to travel in a substantially forward direction on the ground; and disabling the heading control system if it is determined that the aircraft is not configured to be travelling in a substantially forward direction on the ground.

Optionally, the determination is made on the basis of one or more of: GPS data indicating a taxi-able position, a position of the aircraft rudder controls, a measured degree of acceleration, a measured degree of compression of one or more landing gear.

Optionally, the method comprises determining whether, after landing, the aircraft has travelled in a substantially forward direction for greater than a predetermined time, and enabling the heading control system if the aircraft has travelled in a substantially forward direction for greater than the predetermined time.

A third aspect of the present invention provides an aircraft comprising a heading control system according to the first aspect.

A fourth aspect of the present invention provides a computer program which, when executed by a processor, causes the processor to: receive a bias signal indicating a bias towards the port or the starboard of the aircraft; generate, based on the bias signal, an offset angle defining an offset from a longitudinal axis of the aircraft and control a nose wheel angle within an angular range based on the offset angle.

BRIEF DESCRIPTION OF THE DRAWINGS

Embodiments of the invention will now be described, by way of example only, with reference to the accompanying drawings, in which.

DETAILED DESCRIPTION

Figure 1A:
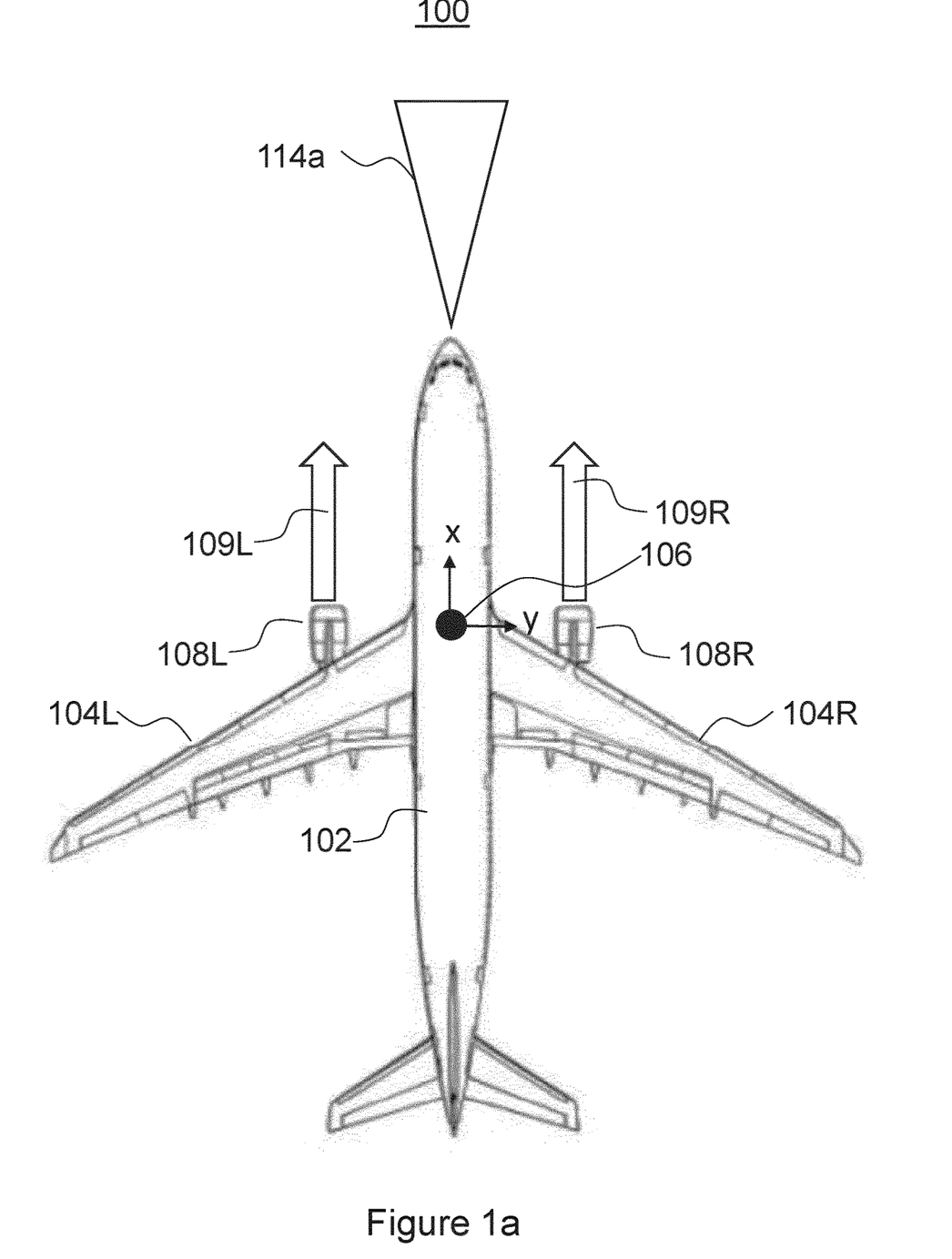
FIG. 1a is a schematic diagram showing a plan view of an aircraft according to an embodiment.

FIG. 1a is a plan view of an aircraft 100 having a fuselage 102 and wings including a left wing 104L and a right wing 104R extending outwardly from the fuselage 102. The aircraft 100 is aligned with a set of axes including a longitudinal axis denoted by an arrow labelled x, which is parallel to the direction of the aircraft 100 in straight and level flight and a lateral axis denoted by an arrow labelled y in a direction perpendicular to the x axis. The aircraft 100 has a centre of gravity 106.

During ground operations, the aircraft 100 might, in some circumstances be propelled forward by its engines, which in the example shown in FIG. 1, include a left engine 108L and a right engine 108R. In other examples the aircraft might include more than one left and right engines. The left engine 108L might be mounted on or under the left wing 104L and the right engine 108L might be mounted on or under the left wing 104R.

When both engines 108L, 108R are providing the same amount of thrust, indicated by thrust vectors 109L, 109R shown as arrows in FIG. 1a, the engines do not provide a yawing moment about the centre of gravity 106.

Figure 1B:
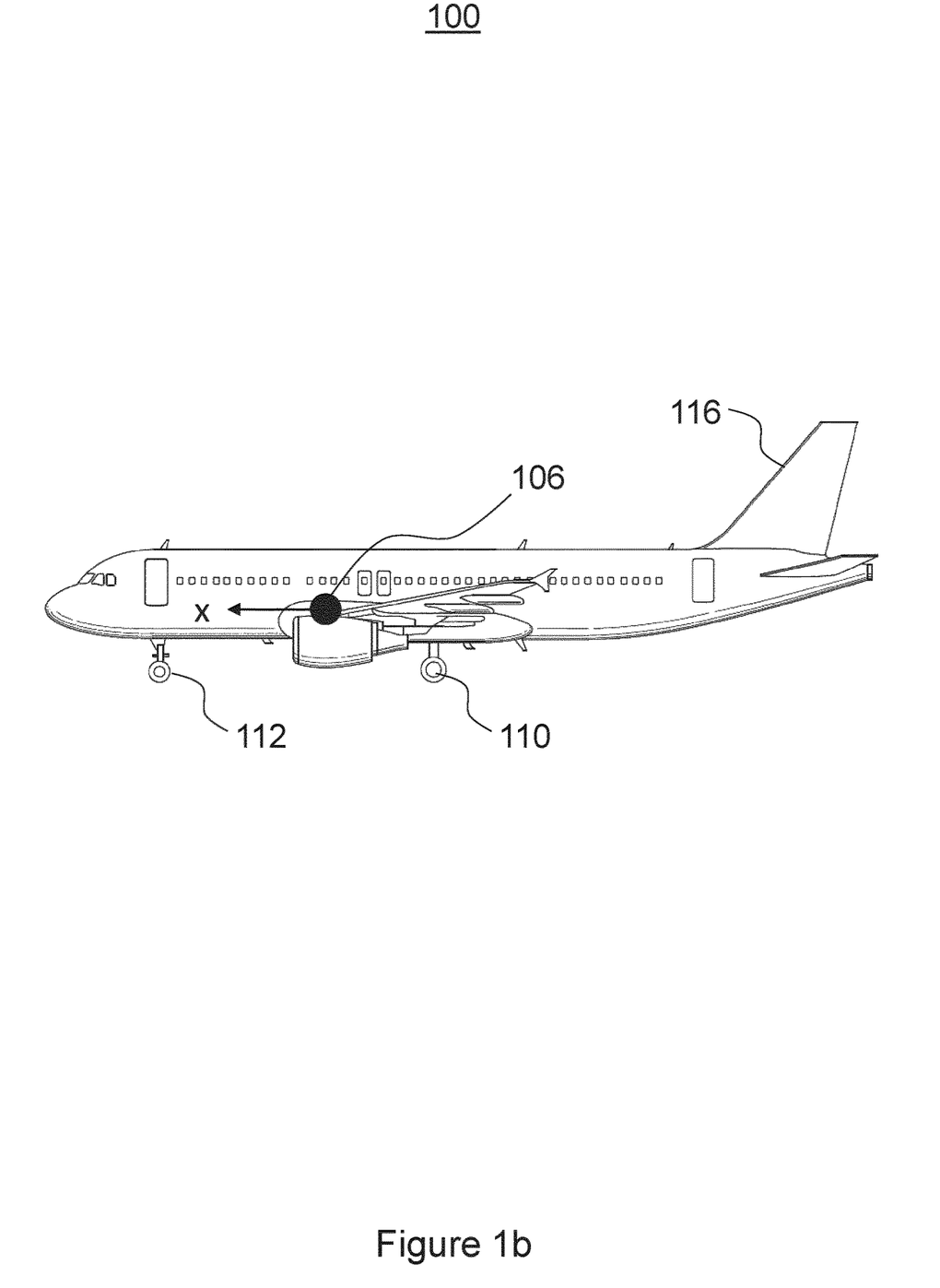
FIG. 1b is a schematic diagram showing a side view of an aircraft according to an embodiment.

FIG. 1b is a side view of an aircraft such as the aircraft 100 shown in FIG. 1a. The aircraft 100 has landing gear, which supports the aircraft when it is on the ground and controls the movement of the aircraft 100 during ground manoeuvres such as landing, taxiing and take off. The landing gear comprises a main landing gear (referred to hereinafter as the MLG 110) and a nose landing gear (referred to hereinafter as the NLG 112). During ground manoeuvres, at speeds at which a vertical stabilizer 116 of the aircraft does not produce enough of an aerodynamic effect to steer the aircraft 100, the NLG 112 is steerable to steer the aircraft 100. To steer the aircraft 100, the NLG 112 is moved by an angle with respect to the x axis to steer the aircraft 100. Such movements of the NLG 112 can be manually steered under control of the flight crew using a tiller, steering wheel, or other steering mechanism provided in the cockpit of the aircraft 100.

In the absence of other yawing moments, when the both the left and right engines 108L, 108R are providing equal thrust, the thrust provided by the engines 108L, 108R is applied equally about the centre of gravity 106 and the aircraft 100 will advance along the x axis. During ground manoeuvres, the aircraft 100 will experience forces that, without correction, may cause the heading of the aircraft 100 to deviate from the x axis. For example, influences such as crosswinds, cambers on the taxiways and runway, asymmetry in tyre pressures or tyre radii of different tyres of the MLG 110, or braking effects in different wheels of the MLG 110, for example, may result in the heading of the aircraft 100 deviating even while the thrust provided by each of the engines 108L, 108R is equal, and without any input from the flight crew.

To reduce the workload of the flight crew in correcting these deviations, some aircraft are equipped with a control system, referred to herein as a heading control system, that can adjust the angle of the NLG 112 without manual input from the flight crew. The degree to which such heading control systems can adjust the angle of the NLG 112 (referred to hereinafter as an "authority") is limited to ensure that the heading control system cannot make unsafe adjustments to the NLG 112, and cannot mask potentially unsafe states to the flight crew; for example, the limits may be determined to prevent the aircraft overcompensating from deviations from an intended heading (for example, veering to one side or the other) that may, in some circumstances, cause the aircraft 100 to manoeuvre away from paved areas of an airfield, and/or provide an uncomfortable feeling to passengers in the cabin of the aircraft 100. The authority may define a range of angles within which the NLG 112 can be controlled to provide a range of steering angles 114a as shown in FIG. 1a.

Figure 2:
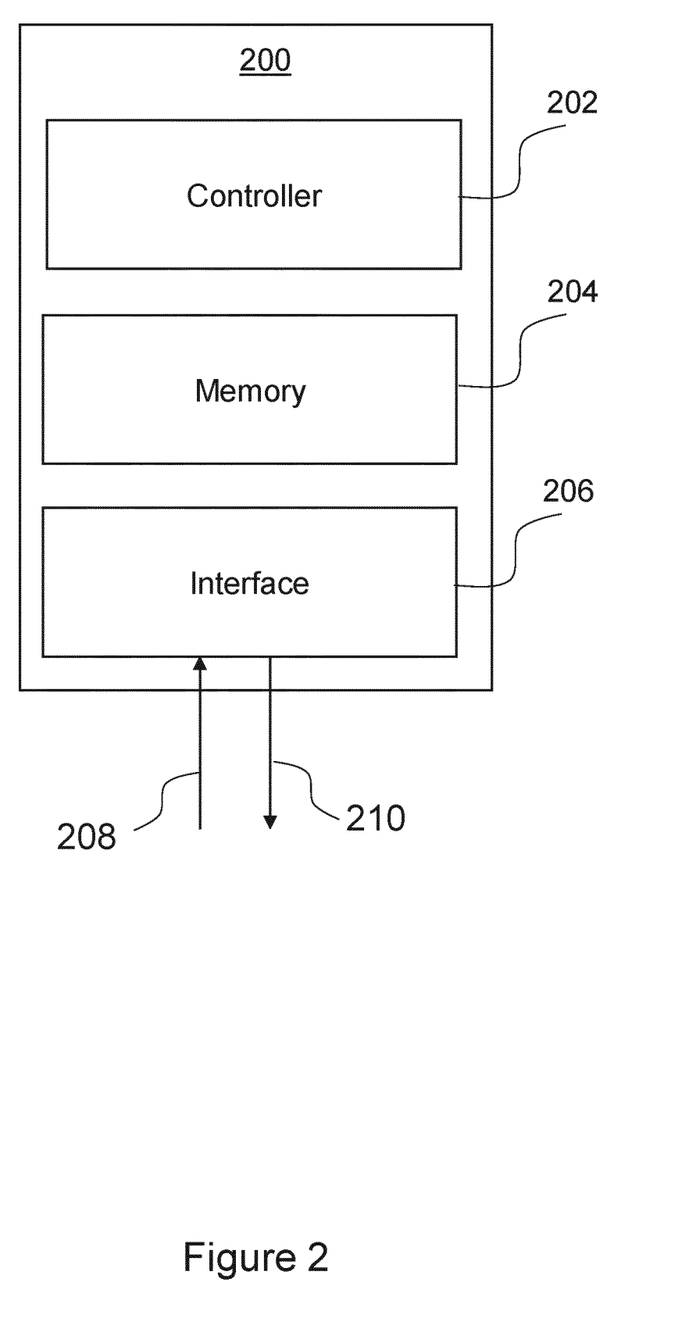
FIG. 2 is a schematic diagram showing a heading control system according to an embodiment.

FIG. 2 illustrates a heading control system 200 according to an embodiment. The control system 200 is a computerised device implemented by a controller 202, which may be a processor executing software instructions stored in a memory 204 on the basis of inputs received via an interface 206. Although, in the example shown in FIG. 2, the heading control system 200 is implemented in software executed by hardware (controller 202) in some examples, the heading control system 100 may be implemented entirely in hardware.

The controller 202 may be arranged to provide proportional-integral-derivative (PID) control, in which gain settings for proportional, integral and derivative terms may be summed together to provide an overall gain value that is then applied to a feedback loop controlling an angle of the NLG 112. In other examples, other forms of controller may be used. For example, the controller 202 may provide only proportional and integral control (a so-called PI controller), only proportional and derivative control (a so-called PD controller) or only proportional control.

The controller 202 may be arranged to operate in a number of modes with each mode having an associated set of gain terms corresponding to the proportional, integral and derivative terms applied to the controller 202.

For example, the controller 202 may operate in a first mode when the aircraft is operating with both engines 108L, 108R providing equal thrust vectors 109L, 109R, as shown in FIG. 1a.

The interface 206 is arranged to receive incoming data referred to hereinafter as a bias signal 208 and to transmit outgoing data referred to hereinafter as a control signal 210.

The bias signal 208 may include data that the controller 202 may apply or use to determine gain values to generate the control signals 210 for controlling the NLG 112.

For example, in the first mode, gain terms applied by the controller 202 may be selected or "tuned" such that the controller 202 provides a control signal 210 indicating a deviation from a determined (e.g. straight-line, along the x-axis) heading, with equal priority given to corrections to the left (port) and right (starboard). That is, the authority of the controller 202 (i.e. the range of angles within the NLG 112 is permitted to be controlled) is centred on the longitudinal axis of the aircraft 100 (i.e. the x-axis) and is substantially equal from port to starboard (left to right). The controller 202 of the heading control system 200 may have authority to provide automated control of the position of the NLG 112. That is the heading control system 200 is an automated steering system of the aircraft that, within certain limits that constrain the authority of the heading control system 200, can provided automated control of the NLG 112 to steer the aircraft. The limits within which the heading control system 200 can control or vary the NLG 112 may be a predetermined angular range, which may be stored, for example, in the memory 204. For example, the controller 202 may have authority to control the position of the NLG 112 within a range of, for example, ±5 degrees of the position set by the pilot (e.g. using the tiller provided in the cockpit). In some examples, the controller 202 may have authority to control the position of the NLG 112 within a range of ±3 degrees. In some examples, the controller 202 may have authority to control the position of the NLG 112 within a range of ±2 degrees. In other examples, such as may be implemented in smaller aircraft, the controller 202 may have authority to control the position of the NLG 112 within a larger range of angles (e.g. ±12 degrees).

In the first mode, the gain terms applied by the controller 202 are arranged to provide a substantially equal response whether the controller 202 is sending a control signal 210 to actuate the NLG 212 to turn towards the left (port) or right (starboard). In some examples, the gain terms are determined or selected to provide a relatively slow response with minimal overshoot. That is, the gain terms are selected or determined to be relatively heavily "damped".

The controller 202 may, responsive to receipt of the received bias signal 208, operate in a second mode in which the gain terms applied by the controller 202 are unequal so that the aircraft 100 is more sensitive in respect of control signals 210 applied to one side of the aircraft 100 or the other.

For example, the bias signal 208 may indicate to the controller 202 that aircraft is biased to one side or another, and the controller 202 may take corrective action in response. The bias signal 208 may be determined based on any information that the controller 202 can use to determine an asymmetry in the forces applied to the aircraft 100. For example, when the aircraft 100 is being operated in a so-called "one-engine-on" mode in which a dual engine aircraft's thrust is provided by only one of the aircraft's engines, the controller 202 may determine, select or apply a different set of gain terms based on the bias signal 208. In some examples, the bias signal 208 may be based on Boolean signals (i.e. a 1 or a 0) indicating whether the respective engines are on or off. In one example, the bias signal 208 is based on the statuses of engine oil pressure switches of the respective port and starboard engines 108L, 108R of the aircraft 100. For example, if one engine pressure switch (for example that of the port engine 108L) indicates that the left engine is on and the other engine pressure switch indicates that the other engine (for example, the starboard engine 108R) is off, then the bias signal 208 may indicate an offset between the port and starboard (left and right).

In other examples, the bias signal 208 may be based on relative settings applied to the port and starboard engines 108L, 108R of the aircraft 100. For example, the bias signal 208 may be based on one or more of: throttle settings of the respective engines 108L, 108R, temperature measurements from at least one portion of the respective engines 108L, 108R, pressure measurements from at least one portion of the respective engines 108L, 108R (such as an oil pressure), or a fan speed of the respective engines 108L, 108R.

In some examples, the controller 202 may determine an offset angle based on the relative settings or values resulting from those settings. For example, the offset angle may be determined based on a difference between the relative settings or a ratio of the relative settings.

Figure 3:
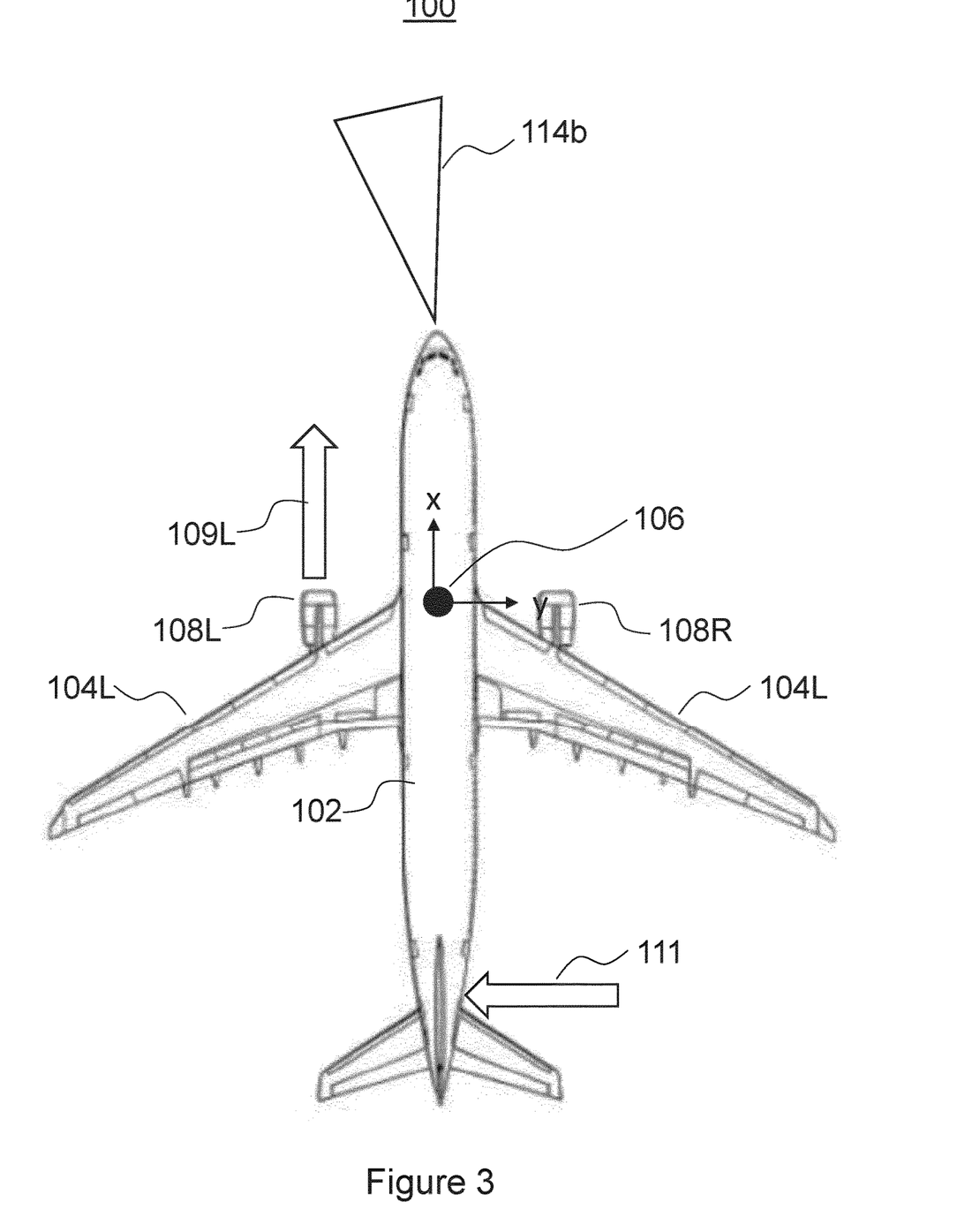
FIG. 3 is a schematic diagram showing a plan view of an aircraft according to an embodiment.

The bias signal 208 may additionally or alternatively be generated based on inputs not relating to inputs from the flight crew but instead from external influences such as crosswinds such as that shown by the arrow 111 in FIG. 3.

The bias signal 208 in effect defines an angle by which the authority is offset from the longitudinal (i.e. x-axis) of the aircraft. In one example, the bias signal 208 is based on (e.g. indicates) readings from one or more sensors of the aircraft. For example, the bias signal 208 may indicate a reading, such as a temperature or pressure reading, of each of the port engine 108L and the starboard engine 108R. The controller 202 may then determine the offset angle based on a relationship between the two readings. For example, data stored in the memory 204 may indicate a relationship between the offset angle and a difference between, or a ratio of, the two readings. The stored data may be determined based on, for example, the statuses of engine oil pressure switches of the respective port and starboard engines 108L, 108R of the aircraft 100. In other examples, the stored data may be based on one or more of: throttle settings of the respective engines 108L, 108R, temperature measurements from at least one portion of the respective engines 108L, 108R, pressure measurements from at least one portion of the respective engines 108L, 108R (such as an oil pressure), or a fan speed of the respective engines 108L, 108R In any event the controller 202 is arranged to receive the bias signal 208 and, on the basis of the bias signal 208, define an offset angle that defines a difference between an angular range centred on the longitudinal axis of the aircraft and an angular range centred on an angle offset from the longitudinal axis of the aircraft.

In the second mode, the gain terms applied by the controller 202 are arranged to provide an unequal response when the controller 202 sends a control signal 210 to actuate the NLG 212 to turn towards the left (port) or right (starboard). For example, the gain terms applied, if is a bias towards the right (for example if the left engine 108L is providing thrust without thrust being provided by the right engine 108R, as shown in FIG. 3, the gain settings applied by the controller 202 may accordingly be unequal. For example, a control signal 210 representing control instructions to control the NLG 212 to the right of the x-axis may be heavily damped such that the response to such instructions is relatively slow response with minimal overshoot. Whereas, a control signal 210 representing control instructions to control the NLG 212 to the left of the x-axis may be less heavily damped so that the response is quicker but there is a greater degree of overshoot. In some examples the gain settings for the less heavily damped side may be selected to provide critical damping to balance overshoot and response time.

FIG. 3 is a plan view of an aircraft 100 such as the aircraft of FIGS. 1a and 1b, in a situation which may cause the controller 202 to operate in the second mode. In the example shown in FIG. 3, only a left single thrust vector 109L is applied and/or a crosswind vector 111 is applied to the aircraft to produce a yawing motion about the centre of gravity 106 of the aircraft 100.

As a result, the aircraft 100 experiences a yawing force about the centre of gravity 106 resulting in generation of a bias signal 208 indicating, for the example shown in FIG. 3, a bias towards the right (starboard) of the aircraft 100 about the centre of gravity 106.

In the second mode, as shown in FIG. 3, the controller 202 may generate or apply gain terms different to those generated or applied in the first mode. In particular the gain terms generated or applied by the controller 202 in the second mode may result in the authority being shifted or expanded in one direction to define a range of angles within which the NLG 112 can be controlled to provide a different range of steering angles 114b as shown in FIG. 3. The range of angles 114b is different to the range of angles 114a shown in FIG. 1a to the extent that it is unequal in that, in the example shown in FIG. 3, gain terms applied to corrections (i.e. steering corrections) that cause the aircraft 100 to steer towards the left (port) are arranged to be less heavily damped (for example critically damped) than gain terms applied to corrections that cause the aircraft 100 to steer towards the right (starboard). For example, such gain terms provide for an increased degree of control of the NLG 112 in one direction (i.e. port rather than starboard) while the controller 202 operates within the safe limits of adjustment of the NLG 112.

For example, in the example shown in FIG. 3, in which the left engine 108L is providing thrust 109L, an increase of the yaw about the centre of gravity in a clockwise direction (as viewed from above) will result in a bias signal 208 commensurate with (e.g. proportional to) the yawing force, which will form the basis of the control signal 210 determined by the or applied by the controller 202.

Figure 4:
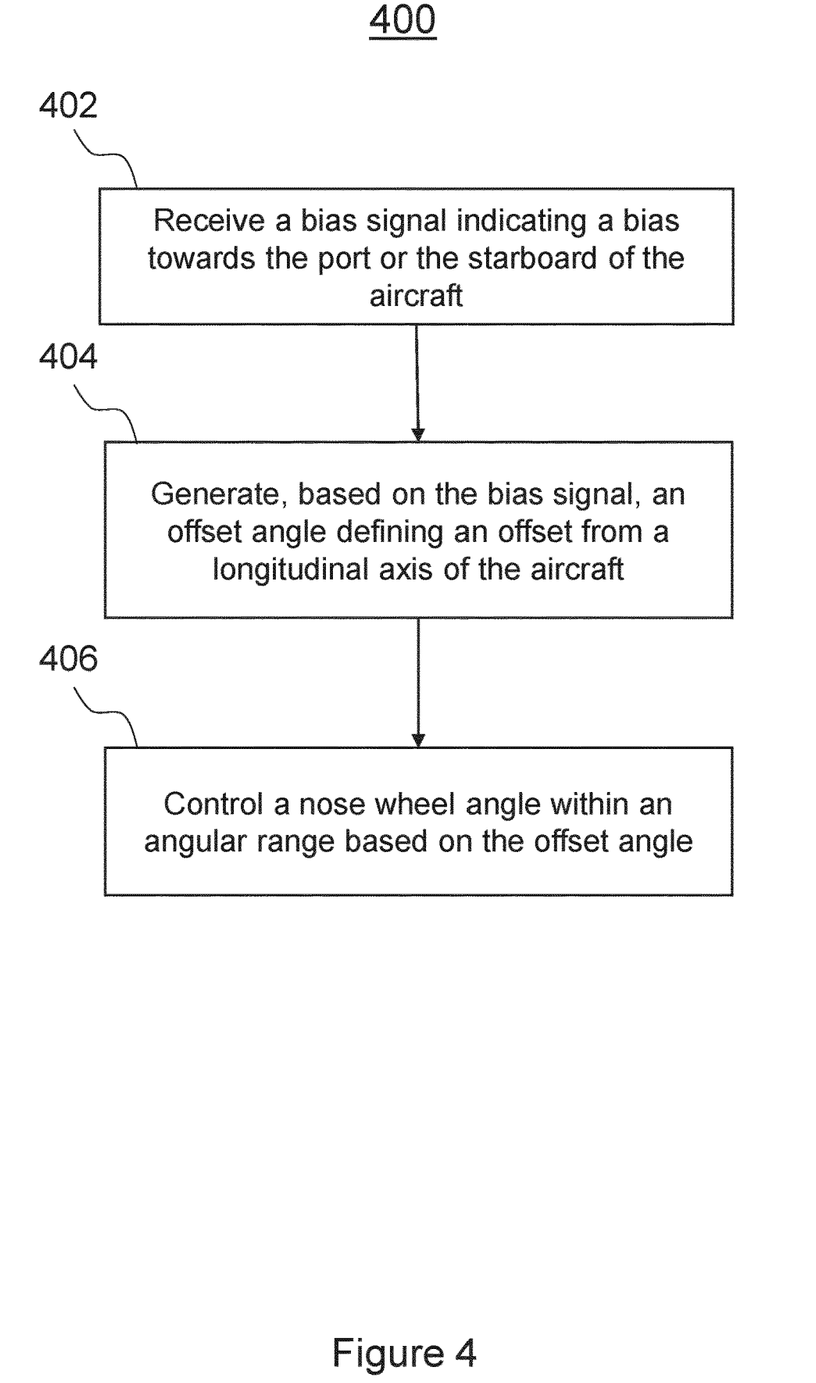
FIG. 4 is a flow diagram of a method of operating a heading control system according to an embodiment.

FIG. 4 is a flow diagram illustrating a method 400 of operating a heading control system of an aircraft, such as the heading control system 200 described above with reference to FIG. 2.

At block 402, a bias signal 208 indicating a bias towards a port or a starboard side of an aircraft is received.

At block 404, based on the received bias signal 208, an offset angle is generated. The offset signal defines an offset from a longitudinal axis of the aircraft (i.e. the x-axis referred to in FIG. 1a).

At block 406, the nose wheel of the aircraft is controlled within the defined angular range.

In some examples, the control system 200 may determine, from the offset signal, whether the aircraft is configured to travel in a substantially forward direction on the ground and the heading control system may be disabled if it is determined that the aircraft is not configured to be travelling in a substantially forward direction on the ground. For example, the determination may be made on the basis of one or more of: GPS data indicating a taxi-able position, a position of the aircraft rudder controls, a measured degree of acceleration, a measured degree of compression of one or more landing gear. For example, during turns the heading control system may be disabled because the heading to which the aircraft is changing and therefore the heading control system has no fixed target heading to aim for. In some examples, a dynamic heading that changes during a turn may be specified; in such examples, the heading control system may not be disabled.

In some examples, the method comprises determining whether, after landing, the aircraft has travelled in a substantially forward direction for greater than a predetermined time, and enabling the heading control system if the aircraft has travelled in a substantially forward direction for greater than the predetermined time. During a landing phase, the heading control system may be disabled because at high speeds small changes to the steering angle can cause large lateral movement of the aircraft, which may be dangerous.

In some embodiments, the heading control system 300 described above with reference to FIG. 3 may be installed in an aircraft, such as the aircraft described above with reference to FIGS. 1a and 1b.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

It is to be noted that the term "or" as used herein is to be interpreted to mean "and/or", unless expressly stated otherwise.

The invention claimed is:

1. A heading control system for an aircraft, the heading control system configured to maintain a heading of the aircraft by controlling a nose gear wheel angle of the aircraft, wherein the aircraft has a port side engine on a port side of the aircraft and a starboard side engine on a starboard side of the aircraft, the heading control system comprising:
   an interface configured to receive a bias signal indicating a bias force towards port or starboard of the aircraft,
   an automated steering system of the aircraft, and
   one or more processors configured to:
      determine whether the aircraft is operating in a first mode, in which the port engine and the starboard engine are both generating thrust to move the aircraft along the heading, or in a second mode, in which the either the port engine or the starboard engine is generating thrust to move the aircraft along the heading;
      while the aircraft is in the first mode, perform a control process to constrain turning of the nose gear wheel by the automated steering system to within a first angular range centered on the longitudinal axis of the aircraft; and
      determine, based on the bias signal and while the aircraft is in the second mode, an offset angle defining an offset from the longitudinal axis of the aircraft; and
      based on the bias signal and while the aircraft is in the second mode, perform a control process to constrain turning of the nose gear wheel by the automated steering system to within a second angular range centered on the offset angle,
      wherein the control process to constrain turning prevents the automated steering system turning the nose gear wheel beyond the first angular range centered on the longitudinal axis during the first mode and prevents the nose gear wheel turning beyond the second angular range offset from the longitudinal axis during the second mode.

2. The heading control system according to claim 1, wherein the bias signal is received from one or more sensors of the aircraft.

3. The heading control system according to claim 2, wherein the bias signal indicates one or more readings from the one or more sensors.

4. The heading control system according to claim 3, wherein the one or more readings comprises a first reading relating to the starboard side engine of the aircraft and a second reading relating to the port side engine of the aircraft.

5. The heading control system according to claim 4, wherein the one or more processors is arranged to determine the offset angle based on a relationship between the first reading and the second reading.

6. The heading control system according to claim 4, wherein the bias signal is based on one or more of: throttle settings of the port side engine and the starboard side engine; temperature measurements from at least one portion of the port side engine or the starboard side engine; pressure measurements from at least one portion of the port side engine or the starboard side engine; or a fan speed of the port side engine or the starboard side engine.

7. The heading control system according to claim 1, wherein the bias signal is based, in part, on a wind direction signal generated by a wind direction sensor configured to determine a wind direction with respect to a longitudinal axis of the aircraft.

8. The heading control system according to claim 1, wherein the offset angle or the second angle is determined based on data indicating a determined ground speed of the speed and/or data indicating a heading of the aircraft.

9. The heading control system according to claim 1, wherein the first angular range or the second angular range is less than or equal to 12 degrees.

10. An aircraft comprising the heading control system according to claim 1.

11. The heading control system according to claim 1, wherein the first angular range or the second angular range is in a range of 2 degrees to 12 degrees.

12. A method of operating a heading control system of an aircraft, wherein the aircraft has a port side engine on a port side of the aircraft and a starboard side engine on a starboard side of the aircraft, the method comprising:
   receiving a bias signal indicating a bias force towards port or starboard of the aircraft;
   determine if the aircraft is in a first mode, in which the port side engine and the starboard side engine are both generating thrust to move the aircraft along the heading, or in a second mode, in which either the port side engine or the starboard side engine is generating thrust to move the aircraft along the heading;
   based on the bias signal and while the aircraft is in the first mode, constraining the turning of the nose gear wheel to confine an angle of the nose gear wheel to within a first angular range centered on a longitudinal axis of the aircraft;
   generating, based on the bias signal and while the aircraft is in the second mode, an offset angle defining an offset from a longitudinal axis of the aircraft;
   based on the bias signal and while the aircraft is in the second mode, constraining the turning of the nose gear wheel to confine the angle of the nose gear wheel to within a second angular range centered on the offset angle, and
   turning a nose gear wheel-so that the turning of the nose gear wheel is constrained to the first angular range during the first mode and to the second angular range during the second mode.

13. The method according to claim 12, comprising:
   determining, from at least the offset signal, whether the aircraft is configured to travel in a substantially forward direction on the ground; and
   disabling the heading control system if it is determined that the aircraft is not configured to be travelling in a substantially forward direction on the ground.

14. The method according to claim 13, wherein the determination is made on the basis of one or more of: GPS data indicating a taxi-able position, a position of the aircraft rudder controls, a measured degree of acceleration, or a measured degree of compression of one or more landing gear.

15. The method according to claim 12, comprising determining whether, after landing, the aircraft has travelled in a substantially forward direction for greater than a predetermined time, and enabling the heading control system if the aircraft has travelled in a substantially forward direction for greater than the predetermined time.

16. The method of claim 12, wherein the first angular range or the second angular range is in a range of 2 degrees to 12 degrees.

17. A computer program stored on a non-transitory memory and which, when executed by a processor, causes the processor to:
   receive a bias signal indicating a bias force towards port or starboard of an aircraft
   determine if the aircraft is a first mode, in which a port side engine on a port side of the aircraft and a starboard side engine on a starboard side of the aircraft are both generating thrust to move the aircraft along a heading, or a second mode, in which either the port side engine or the starboard side engine is generating thrust to move the aircraft along the heading;
   based on the bias signal and while the aircraft is in the second mode, define an offset angle from a longitudinal axis of the aircraft,
   cause an automated steering system of the aircraft to turn a nose gear wheel, wherein the turning of the nose gear wheel is constrained to be within a first angular range centered on the longitudinal axis of the axis if the aircraft is in the first mode, and wherein the turning of the nose gear wheel is constrained to be within a second angular range centered on the offset angle if the aircraft is in the second mode, and
   wherein the control process to constrain turning prevents the automated steering system turning the nose gear wheel beyond the first angular range centered on the longitudinal axis during the first mode and beyond the second angular range centered on the offset angle during the second mode.

18. The computer program of claim 17, wherein the first angular range or the second angular range is in a range of 2 degrees to 12 degrees.

* * * * *